US010936432B1

(12) United States Patent
Lee et al.

(10) Patent No.: US 10,936,432 B1
(45) Date of Patent: Mar. 2, 2021

(54) FAULT-TOLERANT PARALLEL COMPUTATION

(71) Applicant: Amazon Technologies, Inc., Reno, NV (US)

(72) Inventors: Tin-Yu Lee, Seattle, WA (US); Rejith George Joseph, Seattle, WA (US); Scott Michael Le Grand, Soquel, CA (US); Saurabh Dileep Baji, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 96 days.

(21) Appl. No.: 14/495,408

(22) Filed: Sep. 24, 2014

(51) Int. Cl.
 *G06F 11/00* (2006.01)
 *G06F 11/14* (2006.01)

(52) U.S. Cl.
 CPC .................. *G06F 11/1458* (2013.01)

(58) Field of Classification Search
 CPC ............ G06F 11/1458; G06F 11/3404; G06F 11/1407
 See application file for complete search history.

(56) References Cited

U.S. PATENT DOCUMENTS

| 8,108,876 | B2 | 1/2012 | Arimilli et al. |
| 8,127,300 | B2 | 2/2012 | Arimilli et al. |
| 8,312,227 | B2 | 11/2012 | Li et al. |
| 8,694,400 | B1* | 4/2014 | Certain .................. G06Q 30/08 705/26.3 |
| 2005/0187859 | A1* | 8/2005 | Growney ........... G06Q 30/0283 705/37 |
| 2007/0277056 | A1* | 11/2007 | Varadarajan ........ G06F 11/1438 714/15 |
| 2010/0153351 | A1* | 6/2010 | Yung .................. G06F 17/30377 707/703 |
| 2010/0281166 | A1 | 11/2010 | Buyya et al. |
| 2012/0284410 | A1* | 11/2012 | Dudek .................. G06F 9/5072 709/226 |
| 2013/0297624 | A1 | 11/2013 | Raghunathan et al. |
| 2014/0143251 | A1 | 5/2014 | Wang et al. |
| 2016/0179627 | A1* | 6/2016 | Dusi ................... G06F 11/1451 714/19 |

OTHER PUBLICATIONS

"MPI: A Message-Passing Interface Standard Version 3.0", Message Passing Interface Forum, Sep. 21, 2012, pp. 1-822.

* cited by examiner

*Primary Examiner* — Katherine Lin
(74) *Attorney, Agent, or Firm* — Robert C. Kowert; Kowert, Hood, Munyon, Rankin & Goetzel, P.C.

(57) ABSTRACT

Methods, systems, and computer-readable media for implementing a fault-tolerant parallel computation framework are disclosed. Execution of an application comprises execution of a plurality of processes in parallel. Process states for the processes are stored during the execution of the application. The processes use a message passing interface for exchanging messages with one another. The messages are exchanged and the process states are stored at a plurality of checkpoints during execution of the application. A final successful checkpoint is determined after the execution of the application is terminated. The final successful checkpoint represents the most recent checkpoint at which the processes exchanged messages successfully. Execution of the application is resumed from the final successful checkpoint using the process states stored at the final successful checkpoint.

20 Claims, 7 Drawing Sheets

FAULT-TOLERANT PARALLEL COMPUTATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization as well as public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients.

Examples of such large-scale systems include online merchants, internet service providers, online businesses such as photo processing services, corporate networks, cloud computing services (including high-performance computing services for executing large and/or complex computations), web-based hosting services, etc. These entities may maintain computing resources in the form of large numbers of computing devices (e.g., thousands of hosts) which are hosted in geographically separate locations and which are configured to process large quantities (e.g., millions) of transactions daily or even hourly.

Various conventional approaches for distributed, parallel computing have been used to harness these resources to process data. For example, in a MapReduce system, a large data set may be split into smaller chunks, and the smaller chunks may be distributed to multiple computing nodes in a compute cluster for the initial "map" stage of processing. Multiple nodes may also carry out a second "reduce" stage of processing based on the results of the map stage. Other approaches often applied in distributed, parallel computing rely on message passing between pairs of computing nodes in a cluster. For example, Message Passing Interface (MPI) is a portable (i.e., language-independent) communications protocol and message passing interface standard that is sometimes employed in parallel programming to facilitate coordination between the computing nodes that collectively execute a parallel application.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for fault-tolerant parallel computation are described. Using the systems and methods described herein, a distributed application that includes parallel processes may be executed on a set of compute nodes. The parallel processes may use a message passing interface for synchronizing with one another at various checkpoints during the execution of the application. Process states may be stored for the processes at the checkpoints. If any of the processes fail, the execution of the application may be resumed using the process states stored at one of the checkpoints, such as the most recent successful checkpoint. Using these techniques, a distributed, parallel application may be executed in a fault-tolerant manner.

Figure 1:
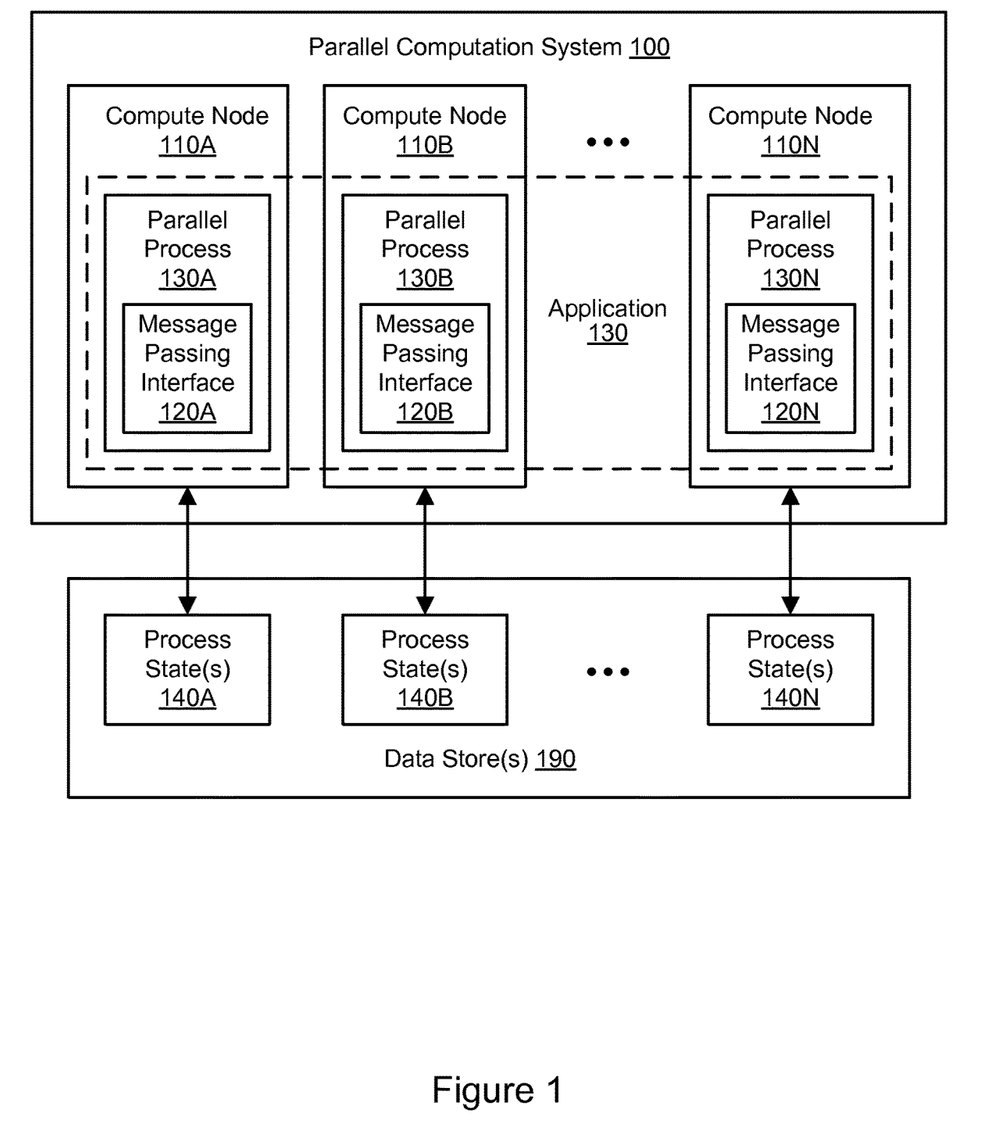
FIG. 1 illustrates an example system environment for fault-tolerant parallel computation, according to some embodiments.

FIG. 1 illustrates an example system environment for fault-tolerant parallel computation, according to some embodiments. The example system environment may include a parallel computation system 100 and one or more data stores 190. The parallel computation system 100 may implement a parallel computation framework using a plurality of computing resources, such as compute nodes 110A and 110B through 110N. Although three compute nodes 110A and 110B through 110N are illustrated for purposes of example, it is contemplated that any suitable number of compute nodes may be used with the parallel computation system 100. The compute nodes 110A-110N may include any suitable type and quantity of hosts. The parallel computation system 100 may also include any suitable type and quantity of storage resources, memory resources, network resources, and/or power resources. Any of the compute nodes 110A-110N may be implemented by the example computing device 3000 illustrated in FIG. 7. The hosts may be coupled using one or more networks, buses, or other interconnects, and the hosts may be located in any suitable number of data centers or geographical locations. It is contemplated that the parallel computation system 100 may include additional components not shown, fewer components than shown, or different combinations, configurations, or quantities of the components shown.

The parallel computation system 100 may be employed to perform high-performance computing (HPC) applications or large and/or complex computations thereof (e.g., computational fluid dynamics simulations for aerospace or mechanical engineering, or molecular fluid dynamics simulations) in distributed computing environments. Accordingly, the parallel computation system 100 may use the compute nodes 110A-110N to execute a distributed application 130. The distributed application may include a plurality of parallel processes such as processes 130A and 130B through 130N. Although three parallel processes 130A and 130B through 130N are illustrated for purposes of example, it is contemplated that any suitable number of parallel processes may be used with the parallel computation system 100. As used herein, the term "parallel processes" indicates processes that are executed at substantially the same time as each other. Parallel processes may typically be executed on different compute nodes but may also be executed on the same compute node.

Each of the compute nodes 110A-110N may use a message passing interface. For example, compute node 110A may use message passing interface 120A, compute node 110B may use message passing interface 120B, and compute node 110N may use message passing interface 120N. The message passing interfaces 120A-120N may be used by the compute nodes 110A-110N to pass data between different ones of the parallel processes, e.g., during the execution of the application 130. In one embodiment, the message passing interfaces 120A-120N may be used by the compute nodes 110A-110N to synchronize the various parallel processes 130A-130N at particular points during the execution of the application 130. The application 130 may include multiple steps or iterations, and the steps or iterations may be divided by checkpoints. In one embodiment, the processes 130A-130N may exchange messages using the message passing interfaces 120A-120N during the checkpoints in the execution of the application 130.

In one embodiment, the message passing interfaces 120A-120N may be implemented in accordance with the Message Passing Interface (MPI) standard. MPI is a portable (i.e., language-independent) communications protocol and message passing interface standard for parallel programming. An MPI implementation uses groups (which are ordered sets of processes) and communicator objects to define which collections of processes may communicate with each other. For example, each group may be associated with a communicator object, and each process in a group may be associated with an integer rank that is unique within the group. The communicator object may be thought of as encompassing a group of processes that may communicate with each other using MPI messages (each of which must specify the communicator object with which the message-passing processes are associated as a "tag" in the message).

The MPI interface standard and corresponding library functions support both point-to-point communications and collective communications. For example, an MPI implementation typically supports various types of point-to-point send and receive operations (including synchronous send operations, blocking and non-blocking send/receive operations, and buffered send operations), collective synchronization operations (in which processes wait until all members of a group reach a synchronization point), collective data movement operations (such as broadcast or gather operations), and reduction operations (e.g., which may be used to combine partial results of computations produced by different nodes or CPU cores). In various implementations, MPI processes are able to dynamically create new MPI processes and/or to dynamically establish communication with other MPI processes that have already been created. For example, an MPI implementation may include an interface that allows one MPI process to spawn one or more instances of another MPI process, each of which can communicate with the parent process and with each other.

An MPI program may comprise, for example, an MPI include file (e.g., "mpi.h"), one or more calls to methods for initializing the MPI environment and to begin executing parallel work (which may include making calls to MPI message passing methods), and (once the parallel work has been completed) calls to one or more methods to terminate the MPI environment. For example, in some implementations, an agent that starts the program (e.g., an "mpirun" or "mpiexec" agent) may be responsible for assigning processes to compute nodes (or to particular CPU cores thereof) as part of the initialization process.

At various points during the execution of the application, process states for the parallel processes 130A-130N may be stored. In one embodiment, the parallel computation system 100 may attempt to store a process state for each of the parallel processes 130A-130N at each checkpoint. For example, process state(s) 140A may be stored for parallel process 130A, process state(s) 140B may be stored for parallel process 130B, and process state(s) 140N may be stored for parallel process 130N. In one embodiment, the process states may be stored when message passing among the processes is performed at a particular checkpoint, e.g., to synchronize the processes 130A-130N. A process state may include a snapshot of any data and/or program code that may be required to resume a particular process from a particular checkpoint. The process states may be stored on the one or more data stores 190. In one embodiment, the process states may be stored using one or more data stores that are external to the compute nodes 110A-110N that implement the processes 130A-130N. In one embodiment, the process states may be stored using multiple storage volumes, e.g., by using one block storage volume per process. In one embodiment, the process states may be stored using a single storage volume, e.g., by using one of the processes to update the single storage volume with the latest process states for all of the processes. As will be discussed in detail below, the stored process states 140A-140N may be used to resume execution of the application 130 after termination of the application, e.g., from a last successful checkpoint before the failure of any of the processes 130A-130N.

In some embodiments, the parallel computation system 100 may be implemented using any suitable number of virtual compute instances and/or physical compute instances, e.g., to implement the compute nodes 110A-110N. The virtual compute instances and/or physical compute instances may be offered to clients, provisioned, and maintained by a provider network that manages computational resources, memory resources, storage resources, and network resources. The provider network may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. In one embodiment, an operator of the provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources. Using such an interface, the parallel computation system 100 may reserve various ones of the compute nodes 110A-110N for a period of time.

In one embodiment, the processes may be executed using a plurality of spot instances. The spot instances may represent compute nodes that are acquired through a bidding process. For example, an entity that wishes to execute a parallel application may bid on a set of spot instances. The bid may indicate a cost per time period (e.g., per hour) that the entity is willing to pay. If the bid meets or exceeds the current market price (i.e., the spot price), then the spot instances may be provided for execution of the parallel application. However, because availability of the spot instances may vary in real time based on supply and demand, the parallel application may lose access to the spot instances at any given point. Using the systems and methods described herein, the execution of the parallel application may be resumed from the last checkpoint when the spot instances (or any other compute nodes) are available again.

Figure 2:
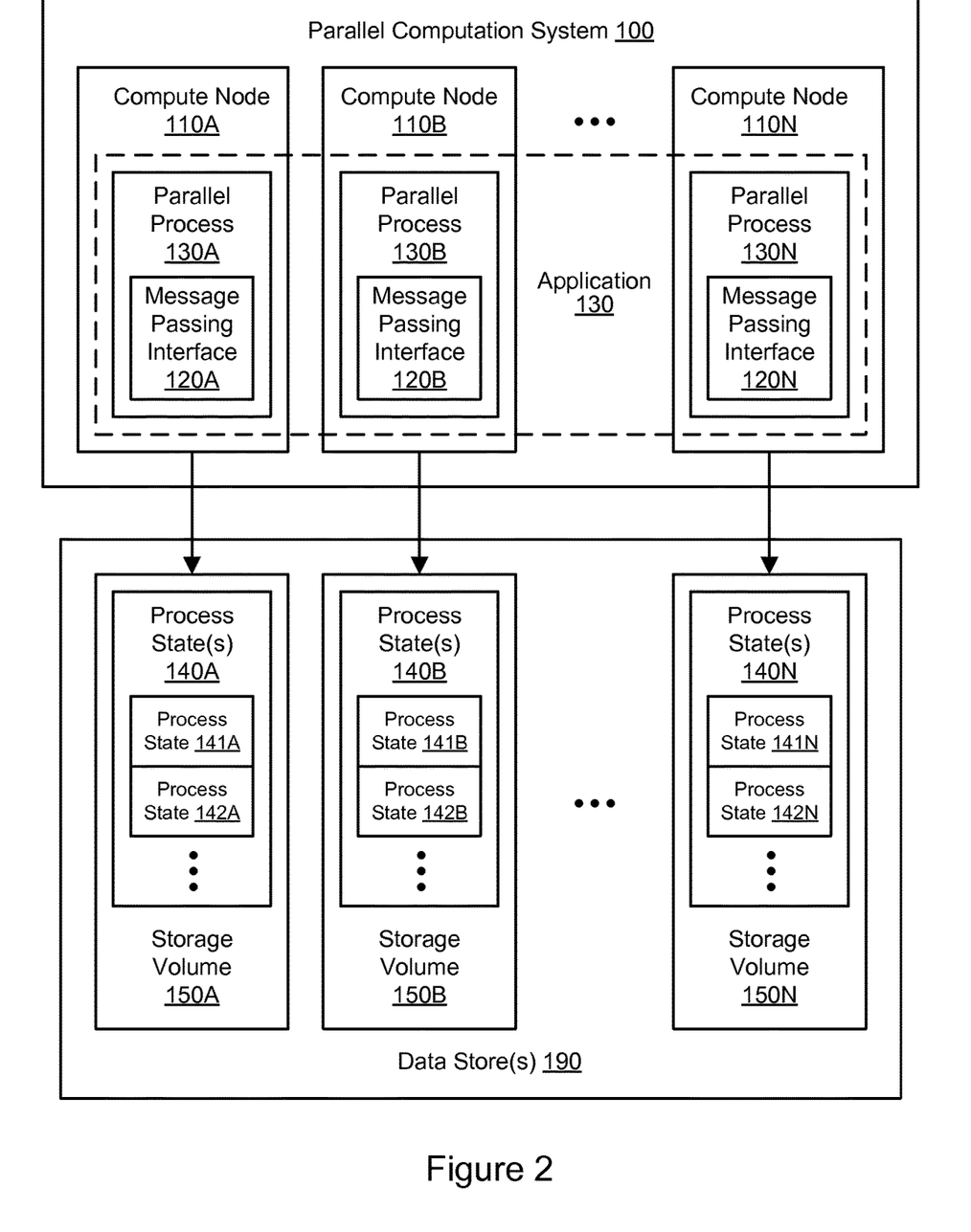
FIG. 2 illustrates further aspects of the example system environment for fault-tolerant parallel computation, including storage of process states for different processes in different storage volumes, according to some embodiments.

FIG. 2 illustrates further aspects of the example system environment for fault-tolerant parallel computation, including storage of process states for different processes in different storage volumes, according to some embodiments. As discussed above, the parallel computation system 100 may attempt to store a process state for each of the parallel processes 130A-130N at each checkpoint during the execution of the application 130. For example, process state(s) 140A may be stored for parallel process 130A, process state(s) 140B may be stored for parallel process 130B, and process state(s) 140N may be stored for parallel process 130N. The process states may be stored using multiple storage volumes. In one embodiment, each of the processes 130A-130N may be associated with a particular storage volume during the execution of the application. As shown in FIG. 2, the process 130A may be associated with storage volume 150A, the process 130B may be associated with storage volume 150B, and the process 130N may be associated with storage volume 150N.

In one embodiment, process states for two or more checkpoints may be stored for any of the processes 130A-130N. As shown in FIG. 2, the process states 140A may include process states 141A and 142A representing different checkpoints, the process states 140B may include process states 141B and 142B representing different checkpoints, and the process states 140N may include process states 141N and 142N representing different checkpoints. For example, successive process states (e.g., process states for successive checkpoints) may be appended to previous process states for the corresponding process. In one embodiment, the process states may be stored with sequence indicators that indicate a particular step or iteration of the application prior to the checkpoint at which the process state was stored. In one embodiment, the process states may be stored with time indicators that indicate a time at which the process state was stored. The process states stored at a particular checkpoint may be identified and/or correlated with that checkpoint using the sequence indicators or the time indicators.

The storage volumes 150A-150N may provide block storage with relatively high availability. However, it is contemplated that the storage volumes 150A-150N may be implemented using any suitable type(s) of storage technology. In one embodiment, the storage volumes 150A-150N may represent virtual storage devices and may be obtained from the same provider network that offers the compute nodes 110A-110N. Accordingly, the storage volumes 150A-150N may be implemented using any suitable number of underlying storage devices.

Figure 3:
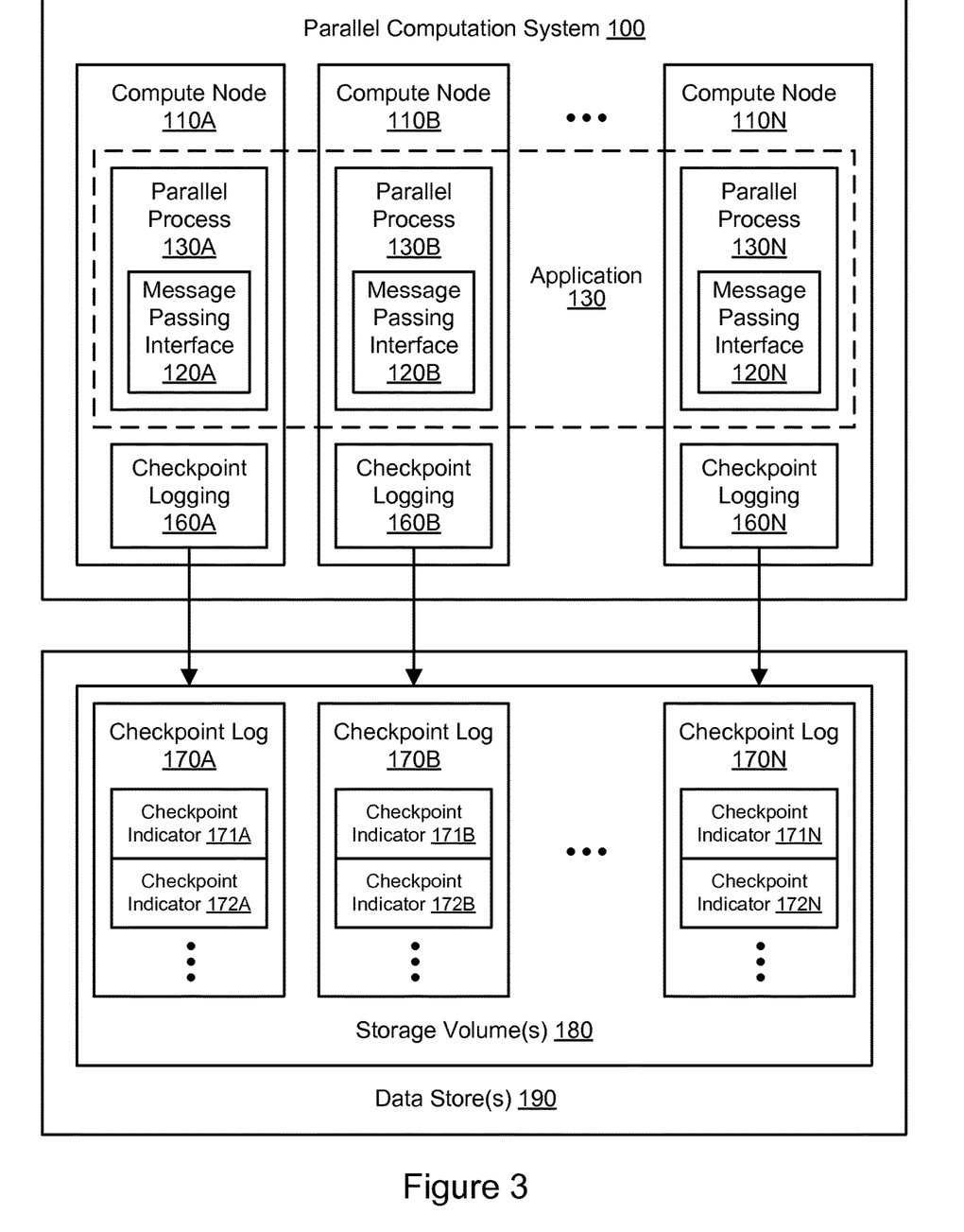
FIG. 3 illustrates further aspects of the example system environment for fault-tolerant parallel computation, including storage of a checkpoint log, according to some embodiments.

FIG. 3 illustrates further aspects of the example system environment for fault-tolerant parallel computation, including storage of a checkpoint log, according to some embodiments. In one embodiment, one or more checkpoint logs may be stored to indicate a successful message exchange among the processes 130A-130N at one or more of the checkpoints. As shown in the example of FIG. 3, checkpoint log 170A may be stored for process 130A, checkpoint log 170B may be stored for process 130B, and checkpoint log 170N may be stored for process 130N. Each checkpoint log 170A-170N may include a plurality of checkpoint indicators such as checkpoint indicators 171A and 172A for checkpoint log 170A, checkpoint indicators 171B and 172B for checkpoint log 170B, and checkpoint indicators 171N and 172N for checkpoint log 170N. Each checkpoint indicator may represent successful message exchange by the corresponding process at the corresponding checkpoint. Each checkpoint indicator may include a sequence indicator (e.g., indicating a particular step or iteration of the application prior to the checkpoint) and/or time indicator (e.g., indicating a time at which the checkpoint was encountered). The process state(s) stored at a particular checkpoint may be identified and/or correlated with a checkpoint indicator using the sequence indicators or the time indicators. In one embodiment, the final successful checkpoint prior to termination of the application 130 may be determined using the checkpoint logs 170A-170N. For example, the checkpoint logs 170A-170N may be reviewed to determine the most recent checkpoint at which the plurality of processes exchanged messages successfully and/or had their process states stored successfully.

In one embodiment, one or more of the compute nodes 110A-110N may implement checkpoint logging to save and/or update the checkpoint logs 170A-170N. As shown in the example of FIG. 3, compute node 110A may implement checkpoint logging 160A, compute node 110B may implement checkpoint logging 160B, and compute node 110N may implement checkpoint logging 160N. As discussed above, the processes 130B through 130N may use the message passing interfaces 120A-120N to exchange messages during a checkpoint. When the messages have been exchanged, the checkpoint logging functionality for a particular compute node may write the latest checkpoint indicator to the corresponding checkpoint log, e.g., on storage volume(s) 180.

In various embodiments, the checkpoint logs 170A-170N may be stored using one storage volume or a plurality of storage volumes (e.g., one volume per process 130A-130N). In one embodiment, one or more storage volumes 180 may provide storage of hierarchical data within a file system. However, it is contemplated that the storage volume(s) 180 may be implemented using any suitable type(s) of storage technology. In one embodiment, the storage volume(s) 180 may represent one or more virtual storage devices and may be obtained from the same provider network that offers the compute nodes 110A-110N. In one embodiment, each of the storage volume(s) 180 may offer a limited number of "slots" or storage capacity for the checkpoint indicators. Accordingly, the checkpoint logging may iterate through an ordered set of slots or storage locations for successive checkpoint indicators. After the checkpoint logging has reached the final position in a checkpoint log, it may return to the first position and overwrite the existing checkpoint indicator in the first position. The number of positions in a checkpoint log may be customized, where a greater number of positions may provide a greater ability to "rewind" for resuming the execution of the application 130.

Figure 4:
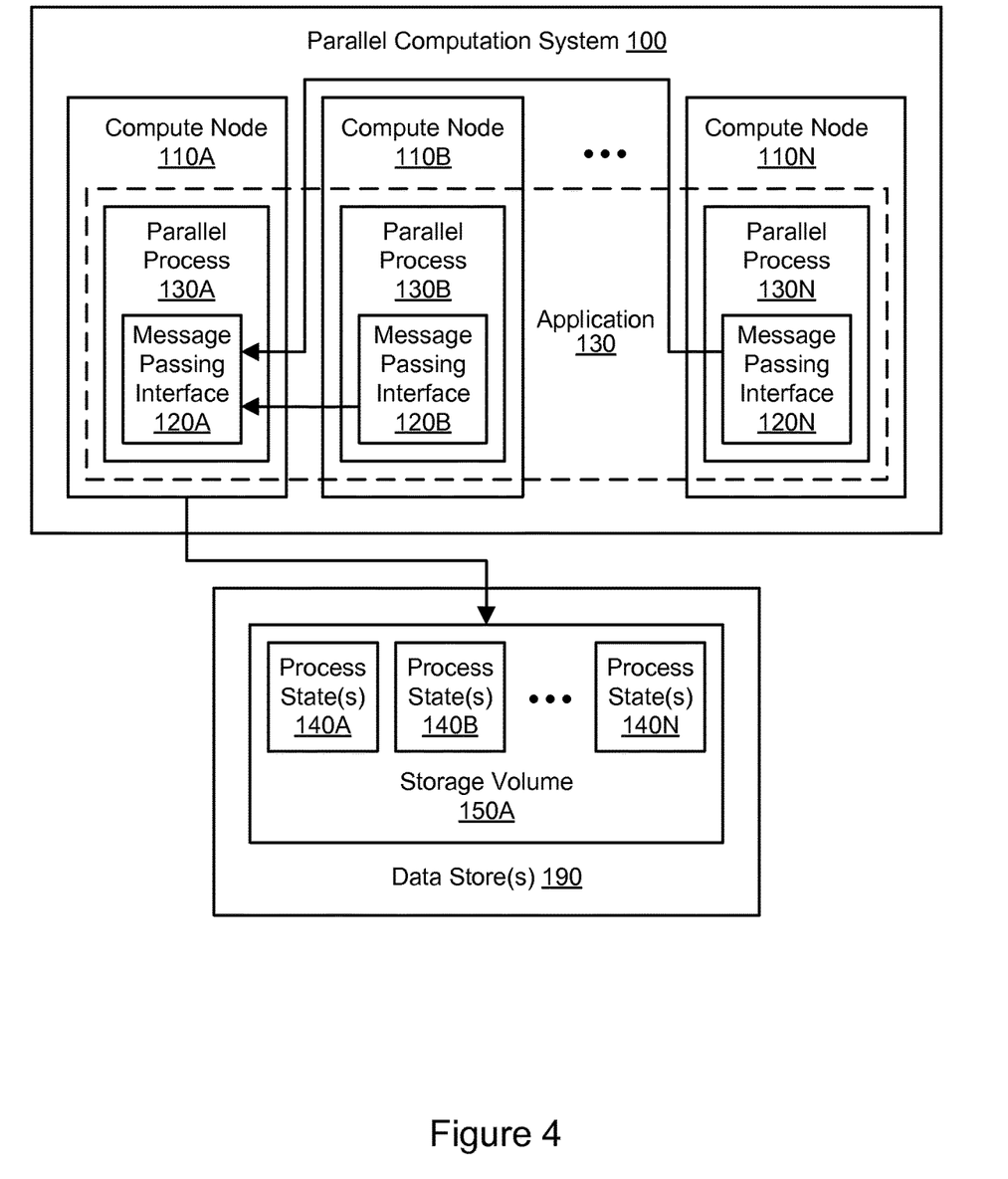
FIG. 4 illustrates further aspects of the example system environment for fault-tolerant parallel computation, including storage of process states for different processes in the same storage volume, according to some embodiments.

FIG. 4 illustrates further aspects of the example system environment for fault-tolerant parallel computation, including storage of process states for different processes in the same storage volume, according to some embodiments. In one embodiment, the process states 140A-140N may be stored using a single storage volume 150A. In one embodiment, fewer than all of the processes 130A-130N may update the single storage volume 150A with the latest process states for all of the processes. As shown in FIG. 4, for example, the single compute node 110A may act as a master node to provide process state storage for all of the processes 130A and 130B through 130N. Accordingly, the processes 130B through 130N may use the message passing interfaces 120A-120N to provide relevant information to the compute node 110A regarding the process states 140B-140N. The compute node 110A may then store the process states 140A-140N in the storage volume 150A. The storage volume 150A may be implemented using any suitable type(s) of storage technology. In one embodiment, a master node such as compute node 110A may provide centralized checkpoint logging for a plurality of nodes in a similar manner.

In one embodiment, the storage volume 150A may offer a limited number of "slots" or storage capacity for the process states 140A-140N. Accordingly, the compute node 110A may iterate through an ordered set of slots or storage locations for the process states for successive checkpoints. After the compute node 110A has reached the final position in the storage volume 150A, it may return to the first position and overwrite the existing process states in the first position. The number of positions in the storage volume 150A may be customized, where a greater number of positions may provide a greater ability to "rewind" for resuming the execution of the application 130.

Figure 5:
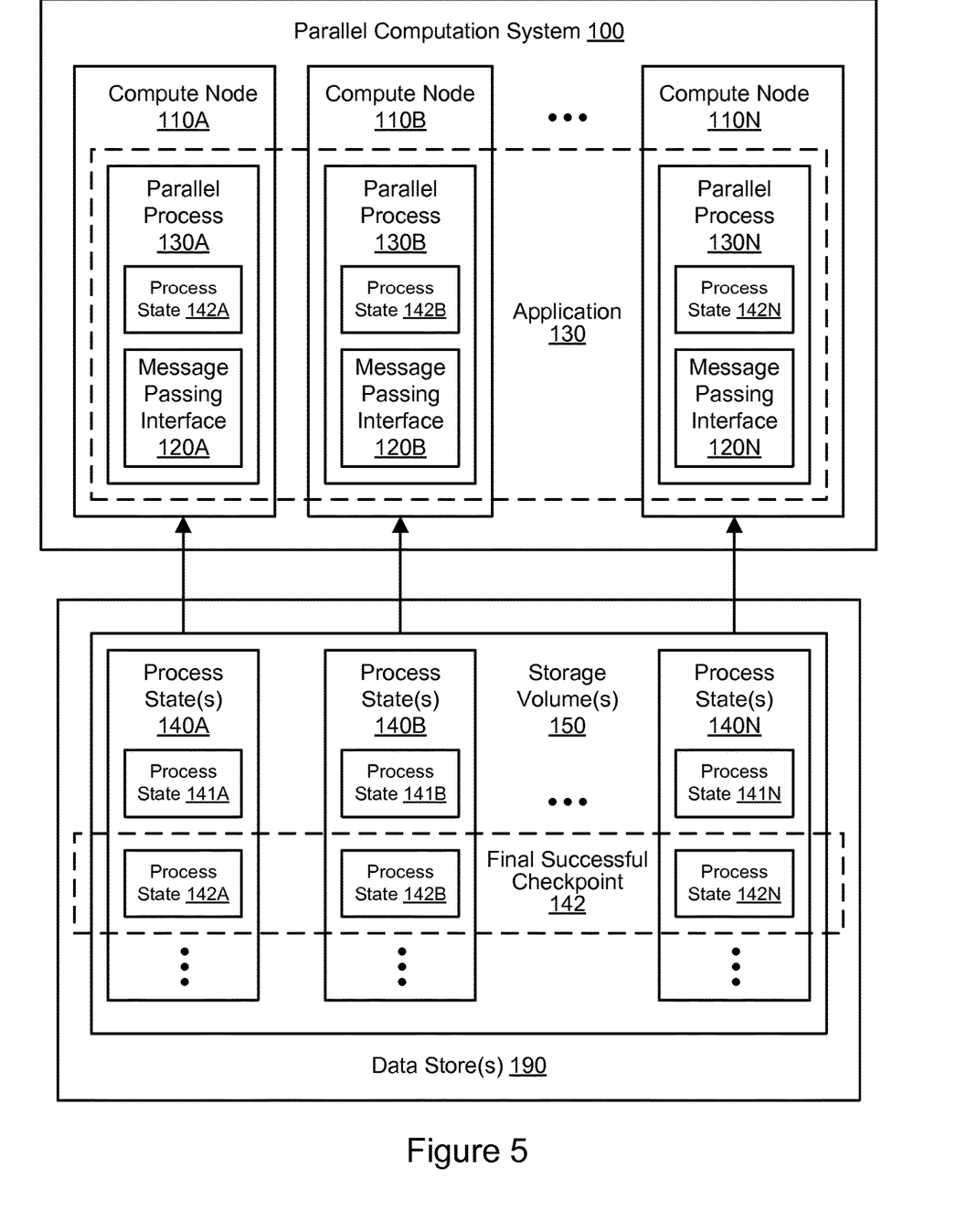
FIG. 5 illustrates further aspects of the example system environment for fault-tolerant parallel computation, including restoration of process states based on a final successful checkpoint, according to some embodiments.

FIG. 5 illustrates further aspects of the example system environment for fault-tolerant parallel computation, including restoration of process states based on a final successful checkpoint, according to some embodiments. At some point, the execution of the application 130 may be terminated. In one embodiment, the execution of the application may be terminated automatically in response to a failure of one or more of the processes. In one embodiment, a component of the parallel computation system 100 may initiate the termination upon detecting the failure of the one or more failed processes. In some circumstances, processes may fail between checkpoints, e.g., during the processing of a step or iteration of the application. Consequently, not all of the processes may exchange messages and/or have their process states stored at the next checkpoint after the failure has occurred.

After the application 130 has been terminated, a component of the parallel computation system 100 may determine a final successful checkpoint 142. The final successful checkpoint 142 may represent the most recent checkpoint at which the processes 130A-130N exchanged messages successfully and/or had their process states stored successfully. In one embodiment, the process states may be stored with sequence indicators (e.g., indicating a particular step or iteration of the application prior to the checkpoint at which the process state was stored) or time indicators (e.g., indicating a time at which the process state was stored). The process states stored at the final successful checkpoint 142 may be identified and/or correlated with the final successful checkpoint using the sequence indicators or the time indicators. In one embodiment, the final successful checkpoint 142 may be determined using the checkpoint log(s), e.g., by reviewing the checkpoint log(s) to determine the most recent checkpoint at which the plurality of processes exchanged messages successfully and/or had their process states stored successfully. In one embodiment, the checkpoint log(s) may specify a sequence indicator and/or time indicator for each checkpoint.

As shown in the example of FIG. 5, the final successful checkpoint 142 may correspond to the process state 142A for process 130A, the process state 142B for process 130B, and the process state 142N for process 130N. The corresponding process states for the various processes may be retrieved from the data store(s) 190 and provided to the processes so that execution of the application 130 may resume. Using the stored process states 142A-142N, the execution of the application 130 may be resumed from the final successful checkpoint 142. Upon restart of the application 130, a component of the parallel computation system 100 may reattach storage volumes to the corresponding processes so that subsequent process states may be stored. When the application 130 is restarted, different compute nodes and/or storage volumes may be used. Accordingly, the techniques described herein for fault-tolerant parallel computation may be used for migration of the application to other hardware with resumption of execution from a previous checkpoint.

Figure 6:
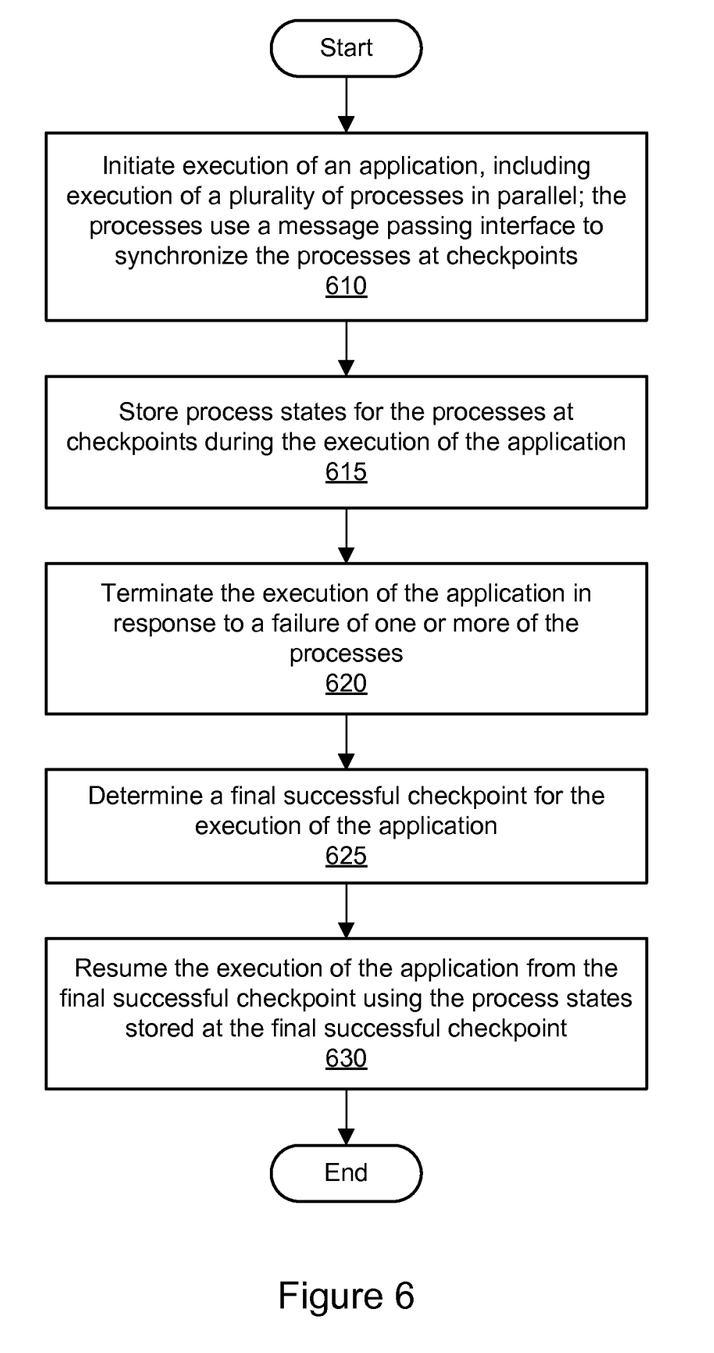
FIG. 6 is a flowchart illustrating a method for fault-tolerant parallel computation, according to some embodiments.

FIG. 6 is a flowchart illustrating a method for fault-tolerant parallel computation, according to some embodiments. As shown in 610, execution of an application may be initiated. The execution of the application may include execution of a plurality of processes in parallel. A parallel computation system may implement a framework for managing the execution of the application in a fault-tolerant manner. In one embodiment, a plurality of compute nodes may be used to implement the processes; for example, each compute node may execute one or more of the processes. The processes may use a message passing interface (e.g., MPI) through which individual processes exchange messages with other processes. The messages may be exchanged using the message passing interface at one or more checkpoints during the execution of the application. The message passing may be used to synchronize the processes. The checkpoints may be located between iterations or steps in the application.

As shown in 615, process states for individual processes may be stored. In one embodiment, the process states may be stored at the checkpoints during the execution of the application. In one embodiment, the process states may be stored when message passing among the processes is performed at a particular checkpoint. A process state may include a snapshot of any data and/or program code that may be required to resume a particular process from a particular checkpoint. The process states may be stored using one or more data stores that are external to the compute nodes that implement the processes. In one embodiment, the process states may be stored using multiple storage volumes, e.g., by using one block storage volume per process. In one embodiment, the process states may be stored using a single storage volume, e.g., by using one of the processes to update the single storage volume with the latest process states for all of the processes. Additionally, one or more checkpoint logs may be stored to indicate a successful message exchange among the processes at one or more of the checkpoints.

As shown in 620, the execution of the application may be terminated. In one embodiment, the execution of the application may be terminated automatically in response to a failure of one or more of the processes. In one embodiment, a management component of the parallel computation system may initiate the termination upon detecting the failure of the one or more failed processes. In some circumstances, processes may fail between checkpoints, e.g., during the processing of a step or iteration of the application. Consequently, not all of the processes may exchange messages and/or have their process states stored at the next checkpoint after the failure has occurred.

As shown in 625, a final successful checkpoint may be determined. The final successful checkpoint may represent the most recent checkpoint at which the plurality of processes exchanged messages successfully and/or had their process states stored successfully. In one embodiment, the process states may be stored with sequence indicators (e.g., indicating a particular step or iteration of the application prior to the checkpoint at which the process state was stored) or time indicators (e.g., indicating a time at which the process state was stored). The process states stored at the final successful checkpoint may be identified and/or correlated with the final successful checkpoint using the sequence indicators or the time indicators. In one embodiment, the final successful checkpoint may be determined using the checkpoint log(s), e.g., by reviewing the checkpoint log(s) to determine the most recent checkpoint at which the plurality of processes exchanged messages successfully and/or had their process states stored successfully. In one embodiment, the checkpoint log(s) may specify a sequence indicator and/or time indicator for each checkpoint.

As shown in 630, the execution of the application may be resumed from the final successful checkpoint using the process states stored at the final successful checkpoint. The corresponding process states for various processes may be retrieved from storage and provided to the processes so that processing may resume. Using these techniques, a distributed, parallel application may be executed in a fault-tolerant manner.

Illustrative Computer System

Figure 7:
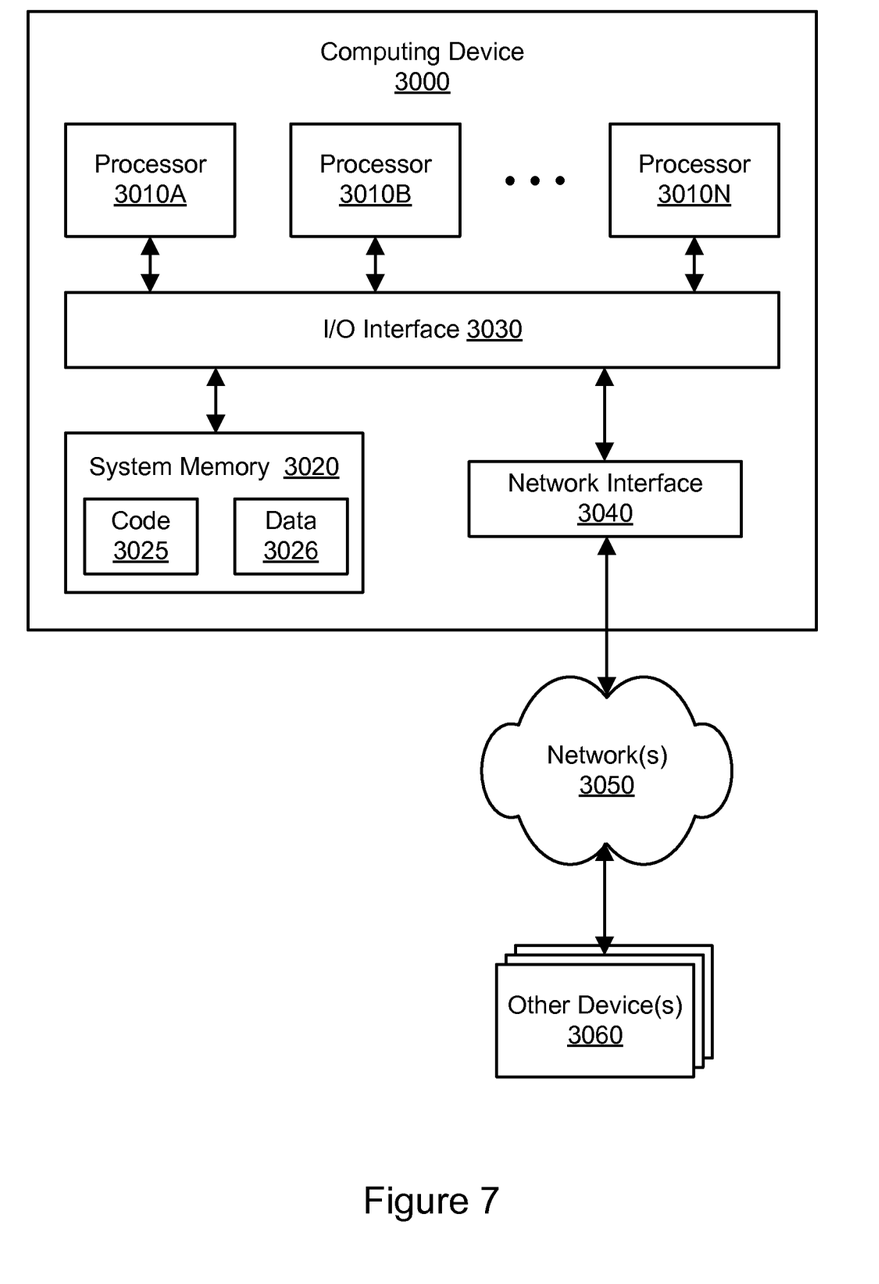
FIG. 7 illustrates an example of a computing device that may be used in some embodiments.

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of computing devices configured to implement a parallel computation system, wherein the parallel computation system is configured to:
   initiate execution of an application comprising execution of a plurality of processes in parallel, the application comprising a plurality of steps or iterations divided in the application by respective checkpoints of a plurality of checkpoints;
   wherein respective checkpoints of the plurality of checkpoints of the same application indicate respective points at which a corresponding portion of the plurality of steps or iterations has been executed during execution of the same application and at which individual ones of the plurality of processes perform, at a given checkpoint of the application, a corresponding message exchange with one or more other processes of the plurality of processes of the same application using respective message passing interfaces;
   store for each respective checkpoint:
   a respective indicator for each of multiple processes of the plurality of processes of the same application that successfully performed the respective message exchange at the respective checkpoint of the application; and
   respective process states for the individual ones of the plurality of processes that successfully performed the respective message exchange at the respective checkpoint of the application, including information to resume the corresponding process from the respective checkpoint;
   in response to a failure of one or more of the plurality of processes during the execution of the application, terminate the execution of the application; and
   after the execution of the application is terminated:
   determine, based on the respective indicators of successful message exchange, a final successful checkpoint of the plurality of checkpoints, wherein the final successful checkpoint is a particular checkpoint among the plurality of checkpoints at which the multiple different ones of the plurality of processes last successfully exchanged messages; and
   restart the execution of the application from the final successful checkpoint using the process states stored at the final successful checkpoint.

2. The system as recited in claim 1, wherein the respective process states are stored with sequence indicators or time indicators, and wherein the process states stored at the final successful checkpoint are correlated with the final successful checkpoint using the sequence indicators or the time indicators.

3. The system as recited in claim 1, wherein the parallel computation system is further configured to:
store one or more checkpoint logs comprising the one or more indicators of successful message exchange among the plurality of processes at one or more of the checkpoints;
wherein the final successful checkpoint is determined using the one or more checkpoint logs.

4. The system as recited in claim 1, wherein the process states are stored using a plurality of block storage volumes, and wherein the plurality of processes are attached to respective ones of the plurality of block storage volumes.

5. A computer-implemented method, comprising:
storing, at a plurality of checkpoints during execution of the application, wherein the application comprises multiple steps or iterations divided in the application by respective checkpoints of the plurality of checkpoints, wherein the execution of the application comprises execution of a plurality of processes in parallel:
respective process states of multiple ones of the processes, having successfully exchanged messages with one or more others of the processes at the various respective checkpoints, including information to resume the corresponding process from the respective checkpoint, and
respective indicators of successful message exchange for the multiple various ones of the plurality of processes that have successfully performed the message exchange with one or more others of the processes at the various respective checkpoints, wherein the plurality of processes use respective message passing interfaces through which individual ones of the processes exchange messages with one or more other processes of the processes of the application, wherein the messages are exchanged at the respective checkpoints of the plurality of checkpoints of the application,
wherein a given checkpoint of the plurality of checkpoints corresponds to a respective point during the execution of the application, and
wherein the respective process states and the respective indicators of successful message exchange are stored at the plurality of checkpoints during the execution of the application;
determining, based on the respective indicators of successful message exchange, a final successful checkpoint of the plurality of checkpoints after the execution of the application is terminated, wherein the final successful checkpoint is a particular checkpoint among the plurality of checkpoints at which the plurality of processes last successfully exchanged messages; and
resuming the execution of the application from the final successful checkpoint using the process states stored at the final successful checkpoint.

6. The method as recited in claim 5, wherein the respective process states are stored with sequence indicators or time indicators, and wherein the process states stored at the final successful checkpoint are correlated with the final successful checkpoint using the sequence indicators or the time indicators.

7. The method as recited in claim 5, further comprising:
storing one or more checkpoint logs comprising the one or more indicators of successful message exchange among the plurality of processes at one or more of the checkpoints;
wherein the final successful checkpoint is determined using the one or more checkpoint logs.

8. The method as recited in claim 5, wherein the process states are stored using a plurality of block storage volumes, and wherein the plurality of processes are attached to respective ones of the plurality of block storage volumes.

9. The method as recited in claim 5, wherein the process states for the plurality of processes are stored by an individual one of the processes using a storage volume.

10. The method as recited in claim 5, wherein the plurality of processes are executed using a plurality of virtual spot instances, wherein the virtual spot instances are acquired for the execution of the application through a bidding process, wherein a given bid indicates a given cost, and wherein the execution of the application is terminated in response to a change in a cost for a particular spot instance that exceeds a particular bid used to acquire the particular spot instance.

11. The method as recited in claim 5, wherein the process states are stored using one or more data stores that are external to a plurality of computing devices that implement the plurality of processes.

12. The method as recited in claim 5, wherein the execution of the application is terminated in response to a failure of one or more of the processes during the execution of the application.

13. A non-transitory, computer-readable storage medium storing program instructions computer-executable to perform:
storing, at a plurality of checkpoints during execution of the application, wherein the application comprises multiple steps or iterations divided in the application by respective checkpoints of the plurality of checkpoints, wherein the execution of the application comprises execution of a plurality of processes in parallel:
respective process states of the multiple processes, having successfully exchanged messages with one or more others of the processes at the various respective checkpoints, including information to resume the corresponding process from the respective checkpoint, and
respective indicators of successful message exchange for the multiple various ones of the plurality of processes that have successfully performed the message exchange with one or more others of the processes at the various respective checkpoints, wherein the plurality of processes use respective message passing interfaces through which individual ones of the processes exchange messages with one or more other processes of the processes of the application, wherein the messages are exchanged at the respective checkpoints of the plurality of checkpoints of the application,
wherein a given checkpoint of the plurality of checkpoints corresponds to a respective point during the execution of the application, and
wherein the respective process states and respective indicators of successful message exchange for various ones of the plurality of processes are stored at the plurality of checkpoints during the execution of the application;
determining, based on the respective indicators of successful message exchange, a final successful checkpoint of the plurality of checkpoints after the execution of the application is terminated, wherein the final successful checkpoint is a particular checkpoint among the plurality of checkpoints at which the plurality of processes last successfully exchanged messages; and resuming the execution of the application from the final successful checkpoint using the process states stored at the final successful checkpoint.

14. The non-transitory, computer-readable storage medium as recited in claim 13, wherein the respective process states are stored with sequence indicators or time indicators, and wherein the process states stored at the final successful checkpoint are correlated with the final successful checkpoint using the sequence indicators or the time indicators.

15. The non-transitory, computer-readable storage medium as recited in claim 13, wherein the program instructions are further computer-executable to perform:
storing one or more checkpoint logs comprising the one or more indicators of successful message exchange among the plurality of processes at one or more of the checkpoints;
wherein the final successful checkpoint is determined using the one or more checkpoint logs.

16. The non-transitory, computer-readable storage medium as recited in claim 13, wherein the process states are stored using a plurality of block storage volumes, and wherein the plurality of processes are attached to respective ones of the plurality of block storage volumes.

17. The non-transitory, computer-readable storage medium as recited in claim 13, wherein the process states for the plurality of processes are stored by an individual one of the processes using a storage volume.

18. The non-transitory, computer-readable storage medium as recited in claim 13, wherein the plurality of processes are executed using a plurality of spot instances, wherein the spot instances are acquired for the execution of the application through a bidding process.

19. The non-transitory, computer-readable storage medium as recited in claim 13, wherein the process states are stored using one or more data stores that are external to a plurality of computing devices that implement the plurality of processes.

20. The non-transitory, computer-readable storage medium as recited in claim 13, wherein the execution of the application is terminated in response to a failure of one or more of the processes during the execution of the application.

* * * * *